United States Patent Office 3,730,926
Patented May 1, 1973

3,730,926
EPOXY RESIN ESTER BASED WATER-SOLUBLE OR WATER-DILUTABLE COATING COMPOSITIONS
Rolf Güldenpfennig, Bammental, Germany, assignor to Reichhold-Albert-Chemie Aktiengesellschaft, Hamburg, Germany
No Drawing. Continuation-in-part of application Ser. No. 861,229, Sept. 23, 1969, which is a continuation of application Ser. No. 617,813, Feb. 23, 1967, both now abandoned. This application May 17, 1971, Ser. No. 144,414
The portion of the term of the patent subsequent to Mar. 21, 1989, has been disclaimed
Int. Cl. C08g 45/00
U.S. Cl. 260—18 EP  8 Claims

ABSTRACT OF THE DISCLOSURE

A method of preparing a water-soluble or water-dilutable synthetic resinous coating composition from compounds containing epoxide groups and/or hydroxyl groups either in the form of polyhydroxy compounds or as hydrolytic cleavage products of the epoxy compounds. The epoxy and/or hydroxy compounds are partially esterified by heating them with polycarboxylic acids produced by reacting unsaturated fatty acids with $\alpha,\beta$-dicarboxylic acid anhydrides and subsequent hydrolysis, and the partial esters with their remaining free carboxyl groups are then neutralized by adding aqueous ammonia until the pH is between 7.8 and 9.0 and the viscosity of the obtained resin amounts to 30 to 120 sec. (German Industrial Standard 53,211).

CROSS-REFERENCE TO RELATED APPLICATIONS

Applicant incorporates herein the disclosures of his copending application Ser. No. 532,866 entiled "Water-Dilutable Coating Compositions and Lacquer Binders," now abandoned.

This is a continuation-in-part of application Ser. No. 861,229 filed Sept. 23, 1969 which in turn is a streamlined continuation of application Ser. No. 617,813, filed Feb. 23, 1967, both now abandoned.

BACKGROUND OF THE INVENTION

(1) Field of the invention

This invention relates to esterified epoxy resin coating compositions and articles coated therewith.

The new epoxy resin esters, produced according to the invention, are suitable as binders for water-dilutable, preferably oven drying, lacquer solutions which provide high quality coatings not only when applied in the customary ways, such as spraying, dipping, casting, etc., but particularly when applied electrophoretically.

It is an object of the present invention to provide improved epoxy based aqueous coating compositions.

A particular object of the invention is an epoxy based coating composition having greater solubility in water.

Another object of the invention is an aqueous coating composition particularly suitable for electrophoretic deposition.

Other objects are the coated articles produced by the compositions of the invention.

Further objects and the full scope of the invention will become obvious to one skilled in the art from a review of the disclosure, examples and claims which follow.

(2) Prior art

Water-soluble epoxy resin esters are described in the prior art Belgian Pat. 637,097 (Spalding). The esters were obtained by the condensation of the reaction product of an unsaturated fatty acid having 10 to 24 carbon atoms with 5 to 25 percent by weight fumaric acid, based on unsaturated fatty acids, the esters having an acid value of 165 to 305 and an epoxy resin content having an equivalent weight less than 1000. The condensation product was converted to a water-soluble salt by adding either ammonia or water-soluble organic amines.

On page 12 of the Belgian Pat. No. 637,097 it has been cautioned intentionally not to use such $\alpha,\beta$-ethylenically unsaturated dicarboxylic acids that can form anhydrides, since these are supposed to polymerize the epoxy resins being present. Therefore it is rather surprising that the above invention makes it possible to react such as $\alpha,\beta$-ethylenically unsaturated dicarboxylic acids forming anhydrides, or their anhydrides respectively, with epoxy resins without danger of polymerizing.

The coating compositions of the present invention find particular use in the method of coating by electrophoretic deposition. The prior art methods for electrophoretic deposition are disclosed in British patent specification 972,169 and the article entitled "Electrophoretic Deposition" in Kirk-Othmer, "Encyclopedia of Chemical Technology," Vol. 5 (1950), pages 606–610, particularly on pages 609–610.

Maleic anhydride finds particular utility as a starting material in the present invention. The preparation and characteristics of this material and related compounds are disclosed in the article "Maleic Acid, Fumaric Acid and Maleic Anhydride" in Kirk-Othmer, "Encyclopedia of Chemical Technology," Vol. 8 (1952), pp. 680–696.

The U.S. Pat. 3,305,501 (Spalding) discloses a process for the preparation of water-soluble epoxy esters comprising condensing an unsaturated fatty acid mixture which is reacted with glycidyl aliphatic polyol forming an epoxy ester composition.

Using the instructions given in the examples of Spalding, coatings are obtained that do not have highly valuable properties after application and stoving because of their content of non-reacted fatty acids. In column 2, lines 58–63, it is said that also adducts of fumaric acid and fatty acid in the molar ratio 1:1 can be used for producing the composition of the above invention. As is shown in Comparison Test 3 of this invention no resins can be produced using this molar ratio because the composition gelatinizes.

The epoxy resin partial ester of the U.S. Pat. 3,305,501 gives coatings that do not have such good corrosion resistance as the coatings of this invention have.

By the U.S. Pat. 3,355,401 (Tanner) a process for the manufacture of water-thinnable coating compositions is described comprising preparing a condensation polymer by condensing a glycidyl polyether of a dihydric phenol with a combination of acidic materials.

The resin accordingly obtained shows a greatly increased viscosity because the compositions contain not-hydrolyzed anhydride groups, because acid anhydrides are also used as epoxy hardeners as described in "Epoxy Resins, Their Applications and Technology" by Henry Lee and Kris Neville, McGraw-Hill Book Company, Inc., New York (1957) in chapter 5: "Organic Acids and Acid Anhydrides as Curing Agents," pages 116 to 140. A further demonstration is given by Comparison Test 2 of this invention.

The resin obtained according to the U.S. Pat. 3,355,401 gives coatings of insufficient layer thickness and subsequently of insufficicnt corrosion resistance when used for the electrophoretic deposition.

U.S. Pat. 2,941,968 (McKenna) describes a method of forming a water-dispersible material which is obtained by heating a mixture consisting of glyceride drying oil and maleic anhydride and hydrolyzing the adduct and after neutralizing adding styrene, vinyl toluene and $\alpha$-methyl styrene.

The method of McKenna does not employ an epoxy resin and therefore does not produce a resin as corrosion resistant as the resins obtained according to this invention.

The Belgian Pat. 662,518 describes a water-dilutable resin composition obained by reacting a diphenol glycidyl polyether with more than one equivalent of an at least dibasic unsaturated fatty acid or its anhydride or its partial ester.

The cited Belgian patent and this invention differ in three points:

(1) the OH/COOH ratio,
(2) the choice of the fatty acids, and
(3) the use of hydrolyzed adducts.

By this invention a surprisingly safe industrial production method for producing epoxy resins is provided. Also epoxy resins of suitable viscosities are presented in order to assure the application of adequate layer thicknesses. For the electrophoretic process only epoxy resin esters can be applied having not too high acid numbers and not too high bath conductivities in order to avoid a high heat development and blister formation during the deposition.

The Belgian Pat. 662,518 employs an OH/COOH ratio of below 1 and the resulting products have high acid numbers. The high acid number is rather unfavorable for the heat development during electrophoretic deposition. The bath temperature rises, and as a result blister formation of the coating cannot be avoided. Also the Belgian patent uses Admerginate adducts, which are very highly viscous already, as can be read in the description of this invention, and the adducts employed are not hydrolyzed.

By these two modes of action a strong rise in the viscosity results during the production of the resin. If the molar ratios of this invention are applied to the adducts of the Belgian patent the rise in the viscosity cannot be brought under control as is demonstrated by the comparison Tests 4 through 9.

U.S. Pat. 3,293,201 (Shahade) claims an air-drying aqueous emulsion coating composition consisting of an adduct of $\alpha,\beta$-ethylenically unsaturated dicarboxylic acid and unsaturated fatty acid ester and of an unsaturated epoxy ester.

The epoxy resin accordingly obtained is completely esterified and does not contain free hydroxyl groups, and as a result the resin is not as corrosion resistant as the products of this invention.

U.S. Pat. 3,251,790 (Christenson) describes a water dispersed coating composition comprising a synthetic polymeric latex and an adduct of $\alpha,\beta$-ethylenically unsaturated dicarboxylic acids or anhydrides and drying and semidrying oil fatty acid esters and this adduct is partly neutralize.

As has been shown by Example 9 of the above invention the resin obtained is free of hydroxyl groups and therefore less corrosion resistant than those products obtained by this invention.

According to British Pat. 1,104,418 (Vianova) a process for coating electrically is claimed using a water-dilutable synthetic resin coating composition containing a resin adduct completely or partly neutralized with ammonia and partly esterified with mono- and polyhydric alcohols and this aduct is produced from $\alpha,\beta$-ethylenicaly unsaturated dicarboxylic acid or anhydride and a drying and/or semi-drying oil and/or a fatty acid thereof.

The above invention does not employ epoxy compounds and can therefore not be compared with this invention in regard to the corrosion resistivity of the products obtained.

U.S. Pat. 3,366,563 (Hart) claims a method of coating a metal substrate electrophoretically using a solubilized vehicle resin consisting of a reaction product of a drying or semi-drying oil fatty acid ester and an anhydride of $\alpha,\beta$-ethylenically unsaturated dicarboxylic acids and this adduct is partly neutralized.

The resins accordingly obtained can by no means be compared with the products of this invention in regard to corrosion resistivity because of lack of free hydroxyl groups which are the prerequisite for forming a resistant coating after baking.

SUMMARY

This invention relates to a method of producing water-dilutable coating compositions by partial esterification of epoxy resins selected from the group consisting of compounds containing epoxy groups or hydroxyl groups produced by hydrolytic cleavage of said epoxy groups, by heating such compounds with tribasic carboxylic acids to reduce the number of epoxy groups contained therein, and neutralizing the partial esters with a basic compound selected from the group consisting of ammonia, organic nitrogen bases and mixtures thereof, the improvement comprising preparing said tribasic carboxylic acids by:

(a) heating an adduct of a member selected from the group consisting of maleic acid or maleic anhydride with unsaturated fatty acids having 10–24 carbon atoms, wherein the molar proportion of said unsaturated fatty acid to said maleic acid or maleic anhydride is 0.9:1 to 1.1:1, and wherein said unsaturated fatty acids are selected from the group consisting of dehydrated castor oil fatty acids, tall oil fatty acids and mixtures thereof;

(b) hydrolyzing said adduct to form said tribasic acids having no anhydride groups, and then esterifying said hydrolyzed adduct by partial esterification of said epoxy resins, wherein the proportion of hydroxyl groups to carboxyl groups falls within the range of 1:1 to 1:1.4, said epoxy groups calculated as 2 hydroxyl groups, producing such epoxy resin partial esters preferably for electrophoretic deposition which have the viscosity in the range of 30–120 sec. in a non-neutralized, anhydrous 50% by weight n-butyl glycol solution according to German Industrial Standard 53,211.

Object of this invention is a method of producing water-dilutable coating compositions by partial esterification of epoxy resins selected from the group consisting of compounds containing epoxy groups or hydroxyl groups produced by hydrolytic cleavage of said epoxy groups, by heating such compounds with tribasic carboxylic acids to reduce the number of epoxy groups contained therein, and neutralizing the partial esters with a basic compound selected from the group consisting of ammonia, organic nitrogen bases and mixtures thereof, the improvement comprising preparing said tribasic carboxylic acids by heating an adduct of a member selected from the group consisting of maleic acid or maleic anhydride with unsaturated fatty acids having 10–24 carbon atoms, wherein the molar proportion of said unsaturated fatty acid to said maleic acid or maleic anhydride is 0.9:1 to 1.1:1 and wherein said unsaturated fatty acids are produced by the saponification of natural semi-drying and drying oils, (b) hydrolyzing said adduct to form said tribasic acids having no anhydride groups and then esterifying said hydrolyzed adduct by partial esterification of said epoxy resins, wherein the proportion of hydroxyl groups to carboxyl groups falls within the range of 1:1 to 1:1.4, said epoxy groups calculated as 2 hydroxyl groups, producing such epoxy resin partial esters preferably for electrophoretic deposition which have the viscosity in the range of 30–120 sec. in a non-neutralized, anhydrous 50 percent by weight n-butyl glycol solution according to German Industrial Standard 53,211.

This invention also relates to a method of producing water-dilutable coating compositions by partial esterification of epoxy resins selected from the group consisting of compounds containing epoxy groups or hydroxyl groups produced by hydrolytic cleavage of said epoxy groups, by heating such compounds with tribasic carboxylic acids to reduce the number of epoxy groups contained therein, and neutralizing the partial esters with a basic compound selected from the group consisting of ammonia, organic nitrogen bases and mixtures thereof, the improvement comprising preparing said tribasic carboxylic acids by (a) heating an adduct of a member selected from the group consisting of maleic acid or maleic anhydride with unsaturated fatty acids having 10–24 carbon atoms, wherein the molar proportion of said unsaturated fatty acid to said maleic acid or maleic anhydride is 0.9:1 to 1.1:1, wherein said unsaturated fatty acids are selected from the group consisting of natural fatty acids, isomerized unsaturated fatty acids, rosin acids, partially hydrated acids and mixtures thereof;

(b) hydrolyzing said adduct to form said tribasic acids having no anhydride groups and then esterifying said hydrolyzed adduct by partial esterification of said epoxy resins, wherein the proportion of hydroxyl groups to carboxyl groups falls within the range of 1:1 to 1:1.4, said epoxy groups calculated as 2 hydroxyl groups.

(I)

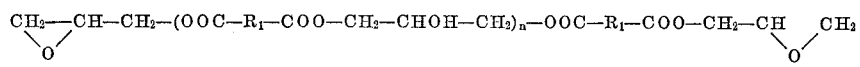

The advantages of the present invention are that for adduct formation the maleic acid anhydride is used, the adduct formation between maleic acid anhydride and the unsaturated fatty acid is effected more quickly than between fumaric acid and the unsaturated fatty acid, furthermore a greater amount (more than 25 percent by weight) of α,β-unsaturated dicarboxylic acid can be added more easily, thus resulting in better water-solubility of the epoxy resin esters produced or in a higher proportion of the esters.

The coating compositions according to the invention are especially suitable for application by electrophoretic deposition when the aqueous electrophoresis bath has a solid content of 5 to 30% by weight.

The water-dilutable coating compositions of the present invention are defined as compositions soluble or dispersible in water, either alone or with the addition of a subordinated amount of an organic solvent miscible infinitely or to a large extent in water. Examples of these solvents are mono- and di-ethers of ethylene glycol and diethylene glycol with low molecular monovalent alcohols, as methanol, ethanol, propanol, isopropanol, n-butanol: also diacetone alcohol, low molecular ketones, such as acetone, methyl ethyl ketone, methyl isobutyl ketone. Colloidal solutions are preferably formed. Compounds containing epoxy groups or hydroxyl groups resulting from epoxy groups are: epoxidized olefins, diolefins and oligo-olefins, such as 1,2,5,6 - diepoxy hexane and 1,2,4,5 - diepoxy hexane, epoxidized olefinically or diolefinically unsaturated carboxylic acid esters with mono- or polyvalent alcohols, such as diepoxy stearic acid or mono epoxy stearic acid esters of methanol, ethanol, n-propanol, including its isomers, n-butanol including its isomers: bis-(diepoxy stearic acid)- and/or bis-(monoepoxy stearic acid)-esters of polyvalent alcohols, such as ethylene glycol, 1,2- or 1,3 - propylene glycol, 1,2-, 2,3-, 1,4-butylene glycol, neopenthrite glycol 1,6 - hexandiol glycerol, trimethylol propane, trimethylol ethane, pentaerythritol tri-(diepoxy stearic acid) and/or tri-(monoepoxy stearic acid) ester of glycerol, trimethylol propane, trimethylol ethane or pentaerythritol tetra-(diepoxy stearic acid)- and/or tetra (monoepoxy stearic acid)-ester of the pentaerythritol. The following also are considered useful: epoxidized unsaturated oils, such as soy bean oil, safflower oil, dehydrated castor oil, alone or in a mixture, epoxidized compounds with several cyclohexenyl radicals, such as diethylene glycol-bis(3,4-epoxy cyclohexane carboxylate) and 3,4-epoxy cyclohexyl methyl - 3,4 - epoxy cyclohexene carboxylate, vinyl cyclohexane dioxide.

Especially suitable are polyesters with epoxy groups, such as produced by reacting a dicarboxylic acid with epihalogenhydrin or dihalogenhydrin, e.g. epichlorohydrin or dichlorohydrin etc., in the presence of alkali. Such polyesters are derived from aliphatic dicarboxylic acids, such as oxalic acid, amber acid, glutaric acid, adipic acid, pimelic acid, suberic acid, azelaic acid, sebacic acid or from aromatic dicarboxylic acids, such as phthalic acid, isophthalic acid, terephthalic acid, 2,6-naphthalene dicarboxylic acid, diphenyl-o,o'-dicarboxylic acid and ethylene glycol-bis-(p-carboxylphenyl)-ether, which are applied alone or in a mixture. They correspond essentially to the formula:

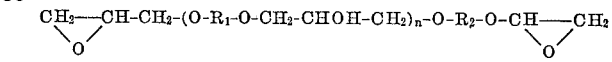

wherein $R_1$ is an aliphatic or aromatic radical and $n=0$ or a small number. Compounds, according to the above-named formula having molecular weights which exceed 3,000, are well suitable. Preferred compounds have molecular weights of between 500 and 1,000.

Polyethers with epoxy groups are best suited, as obtained by etherifying a bivalent alcohol or diphenol with epichlorohydrin or dichlorohydrin in the presence of alkali. Such compounds can be derived from glycols, such as ethylene glycol, diethylene glycol, triethylene glycol, propylene glycol-1,2, propylene glycol-1,3, butylene glycol-1,4-pentanediol-1,5, hexanediol-1,6, and especially from diphenols, such as resorcinol, pyrocatechine, hydroquinone, 1,4-dihydroxynaphthalene, bis-(4-hydroxy phenyl) methane, bis-(4-hydroxy phenyl)-methyl phenyl methane, bis(4-hydroxy phenyl)-tolyl methane, 4,4'-dihydroxy diphenyl and 2,2-bis-(4-hydroxy phenyl)-propane.

The polyethers containing epoxy groups have the following general formula (II)

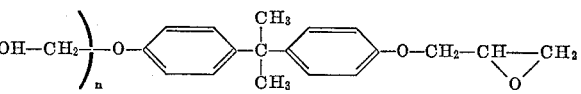

wherein $R_1$ is an aliphatic or aromatic radical and $n=0$ or a small number.

Special emphasis is placed on polyethers containing epoxy groups of the general formula:

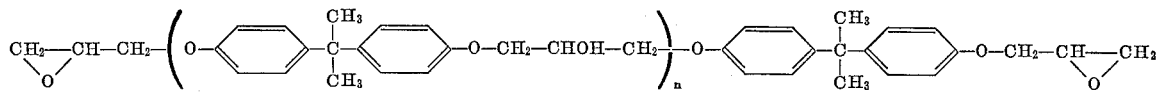

which contain 2,2-bis-(4-hydroxy phenyl)-propane as the initial compound and such polyethers are used, which have molecular weights of between 330 and about 3,500.

Polyethers having a molecular weight of between 380 and approximately 900 are especially suited for electrophoretic deposition. Those having higher molecular weights are also adequate and provide highly corrosion-resistant films, but it is more difficult to obtain thick layers using these. Polyethers with high molecular weights are preferred for water-dilutable coating compounds which are applied by the usual methods, such as dipping, spraying, flowing, coating and brushing.

Furthermore the polyglycidyl ethers of tri- and polyhydroxyl compounds (i.e. ethers with 2 or more glycidyl groups) are used.

Such ethers are trimethylol propane triglycidyl ether, trimethylol ethane triglycidyl ether, glycerol triglycidyl ether, pentaerythritol triglycidyl ether, pentaerythritol tetraglycidyl ether or polyglycidyl ether or esters of polyvalent alcohols with hydroxy acids, such as di- or triglycidyl ether of triricinoleate or castor oil.

Among the polyglycidyl ethers well suited are those which are disclosed in West German published specification 1,184,496 and Pat. 1,138,542, by reaction of novolacs based on phenol, cresol, xylenol, or bisphenols, with epichlorohydrin.

Other expoxides and/or epoxy resins with epoxy groups and hydroxyl groups having molecular weights of up to approximately 3,000 are described in the book "Epoxydverbindungen und Epoxydharze" by A. M. Paquin, Springer-Verlag, 1958, Berlin, Göttingen, Heidelberg.

The epoxy compounds disclosed are also applied usually after the epoxy groups have already been cleaved hydrolytically, either partially or completely, i.e. there are already di- or polyhydroxyl compounds present.

The "tricarboxylic acids" or their partial anhydrides, obtained by addition of $\alpha,\beta$-unsaturated dicarboxylic acids or their anhydrides are used alone or in mixtures. Examples are additions of maleic acid and mesaconic acid or their anhydrides, respectively, among which maleic acid anhydride is preferred, to unsaturated fatty acids, such as palmitoleic acid, petroselinic acid, oleic acid, elaidinic acid, cis-cis-, cis-trans-, trans-trans-9,12-linoleic acid, cis-cis-, cis-trans-, trans-trans-9,11-linoleic acid, linolenic acid with isolated and conjugated double bonds, elaeostearic acid, euruca acid, arachidonic acid, clupanodonic acid, licanic acid and parinaric acid.

The unsaturated fatty acids such as those from cotton seed oil, lupine oil, maize oil, colza oil, sesame oil, grapeseed oil, walnut oil, perilla oil, linseed oil, wood oil, oiticica oil, especially soybean oil, poppy seed oil, sunflower oil and safflower oil are generally used as fatty acid mixtures and are obtained from natural vegetable and animal unsaturated fats by saponification.

Eminently suitable are unsaturated technical fatty acids, especially those from tall oil, chemically treated fatty acids or fatty acids of chemically treated oils, especially fatty acids of dehydrated castor oil or fatty acids conjugated and/or elaidinated by catalytic processes or fatty acids of catalytically conjugated and/or elaidinated fats, especially isomerized soy bean oil, safflower oil, and linseed oil fatty acids. Furthermore, rosin acids, such as colophony or partially hydrogenated rosin acids, are suitable as unsaturated acids. As a rule, however, they are only used in additions of approximately 50% by weight to the fatty acids.

The adducts do not contain more than 3% by weight of maleic acid after hydrolyzing as being described in the examples.

Contrary to the prevailing opinion that for the production of water-soluble synthetic resins, adducts of $\alpha,\beta$-ethylenically unsaturated dicarboxylic acids must be used on trans-trans isomerized fatty acids to avoid the formation of polymeric polybasic acids which would not be suitable for the production of water-soluble synthetic resins (see R. V. Crawford, P. A. Toseland "Fette, Seifen, Anstrichmittel," 66, 1083 (1964), and "Farbe und Lack," 70, 912 (1964), it was unexpectedly discovered that it is exactly the adducts of such nonisomerized fatty acids which are the more suitable ones. Even with fatty acids from dehydrated castor oil, which are used in mixtures with other fatty acids for adduct formation, lower viscosities are obtained than with isomerized fatty acids.

| | Admerginat (R) A hydrolyzed | Adduct (hydrolyzed) | | | | |
|---|---|---|---|---|---|---|
| | | 1 | 2 | 3 | 4 | 5 |
| Gardner-Holdt viscosity, 66.6% in butylglycol. | T+ | G-H | G+ | F | H | F+ |

Adduct 1: 30% dehydrated cator oil fatty acid, 45% distilled tall oil fatty acid with a resin content of about 1%, and 25% maleic acid anhydride, are converted into the adduct in a known manner by heating. After adduct formation there remained less than 1% of the original amount of maleic acid anhydride.

Adduct 2: 45% dehydrated castor oil fatty acid, 30% distilled tall oil fatty acid with a resin content of less than 1%, and 25% maleic acid anhydride are converted into the adduct in a known manner by heating. After adduct formation there remained less than 1% of the original amount of maleic anhydride.

Adduct 3: 75% nonbreaked safflower oil and 25% maleic acid anhydride are converted into the adduct in a known manner by heating. After adduct formation there remained less than 1% of the original amount of maleic acid anhydride.

Adduct 4: 75% light colored linseed oil and 25% maleic acid anhydride are converted into the adduct in a known manner by heating. After adduct formation there remained less than 1% of the original amount of maleic acid anhydride.

Adduct 5: 75% distilled tall oil fatty acid with a resin content of less than 1%, and 25% maleic acid anhydride are converted into the adduct in a known manner by heating. After adduct formation there remained less than 1% of the original amount of maleic acid anhydride.

After their production the adducts were hydrolyzed with water at 100° C. for 2 hours. The reaction temperature in the adduct formation was 180 to 200° C.

By selecting and mixing suitable fatty acids the viscosity ranges of the adducts can be established, as can be seen from the present examples. Fatty acids which are readily polymerizable tend to produce highly viscous adducts while fatty acids of semidrying oils such as soybean or safflower oil produce adducts with low viscosity. Adducts with exceptionally high viscosity are obtained from isomerized and also from dimerized fatty acids so that these components in the preferred forms of this invention are to be considered only as additives. The viscosity can also be affected by the reaction time, the reaction temperature and the sequence of the reactions between the fatty acids and the $\alpha,\beta$-ethylenically unsaturated dicarboxylic acids. At the same time epoxy resin partial esters of the adducts of natural fatty acids show better water solubility. They also show a lighter color, while the adducts of natural fatty acids have lower iodine color numbers. By polybasic carboxylic acids are also meant partial esters of polycarboxylic acids, which however must be polybasic carboxylic acids. Special consideration is to be given to partial esters of polybasic carboxylic acids with saturated straight chain aliphatic monoalcohols with 1 to 20 carbon atoms. Especially suitable among these are the partial esters of the above described "tricarboxylic acids" which are obtained by adduct formation of $\alpha,\beta$-unsaturated dicarboxylic acids or their anhydrides on unsaturated fatty acids. Such partial esters can be obtained either:

(a) by reacting $\alpha,\beta$-unsaturated dicarboxylic acids or their anhydrides with esters of the above-named unsaturated fatty acids with preferably saturated straight chain aliphatic monoalcohols having 1 to 20 carbon atoms such as methanol, ethanol, propanol, butanol, pentanol, hexanol or the like, especially methanol.

(b) by partial esterification of the resulting adduct with preferably saturated, straight chain aliphatic monoalcohols with 1 to 20 carbon atoms such as methanol, ethanol, propanol, butanol, pentanol, hexanol and the like, especially methanol.

The polybasic carboxylic acids obtained by methods (a) and (b) are not identical. The water-dilutable synthetic resins produced therefrom show different behaviors, e.g., in relation to their storage stability. They also show different behaviors in the process of the present invention. The polybasic carboxylic acids obtained by process (b) generally require a somewhat higher esterification temperature and are preferred.

The adduct formation is effected according to known methods by heating, among which the Diels-Alder reactions and the so-called "substituting addition (H. Wagner, H. F. Sarz "Lackkunstharze," 1959, Karl Hanser Verlag, p. 87) are the main reactions. The molar proportion of $\alpha,\beta$-unsaturated carboxylic acids to unsaturated fatty acids varies and naturally depends on the type of fatty acid used: the adducts most preferred, however, being those with a proportion between 0.9:1 and 1.1:1.

Adduct formation is also effected with the oils, i.e., triglycerides, the saponification then taking place subsequently. It is also possible to catalyze the isomerization of the fatty acids during the formation of adducts.

By adding antioxidants, the risk of polymerization during the formation of adducts is reduced. Oils of a relatively low viscosity are then obtained. Additives, such as triphenyl phosphite affect the color favorably and produce light colored adducts, even when raw materials of lower quality are used.

Oils of relatively low viscosity are also obtained by employing preferably adducts of such fatty acids which induce a low viscosity of the resulting adducts, such as drying and semidrying natural fatty acids, tall oil fatty acids or dehydrated castor oil fatty acids.

It is frequently expedient to hydrolyze anhydrides of $\alpha,\beta$-unsaturated dicarboxylic acids before the reaction with the epoxy resin. It is then easier to control the course of the esterification reaction. As a rule, this mode of action is only required when a large number of epoxy groups is still present at the moment of adding the "tricarboxylic acid."

Polybasic carboxylic acids may coincidentally be used, which are alone or in a mixture di-, tri- or polycarboxylic acids, e.g., oxalic acid, amber acid, pimelic acid, suberic acid, azelaic acid, itaconic acid, phthalic acid, isophthalic acid, terephthalic acid, tetra- and hexahydrophthalic acid, trimellitic acid, pyromellitic acid, citric acid, or—as far as they exist—their anhydrides. Among the dicarboxylic acids, the polybasic acids obtained by dimerization or oligomerization or unsaturated fatty acids should be considered. Among the tricarboxylic acids the trimellitic acid is particularly preferred.

When the water-dilutable synthetic resins of the invention are applied as electrophoretic coatings, the latter-named combination consisting of the "tricarboxylic acids" of the characterized type and the partial esters is preferred. When "tricarboxylic acid" adducts having a high content of maleic acid anhydride are used, the acid value of the water-soluble epoxy resin ester is lowered by partial esterification with the quoted mono alcohols, whereby the current yield increases during the electrophoretic film deposition.

Specific examples of the epoxy compound-tricarboxylic acid-amine compositions are:

Bisphenol-A with epichlorohydrin/maleic anhydride with tall oil fatty acids and dehydrated castor oil fatty acids/ammonia, having a maleic acid content below 3% by weight after being hydrolized.

Bisphenol-A with epichlorohydrin/maleic anhydride with tall oil fatty acids and dehydrated castor oil fatty acids/triethylamine, having a maleic acid content below 3% by weight after being hydrolyzed.

When the "tricarboxylic acid" and the possibly coincidentally used polybasic carboxylic acids which are to be esterified with compounds having epoxy groups, or hydroxyl groups, or such polyhydroxyl compounds which have been obtained by hydrolytic cleavage of epoxy compounds, consist of mixtures of polybasic carboxylic acids with carboxyl groups of different reactivity, the partial esterification does not generally take place simultaneously but in successive stages. In this way the acids with less active carboxyl groups are partially esterified at first, usually at higher temperatures, and those with more active carboxyl groups subsequently, usually at lower temperatures. The same is true when anhydrides of polybasic carboxylic acids are reacted.

Esterification is effected at temperatures as low as possible, so as to permit good control of the reaction.

The degree of esterification is preferably so chosen that the "tricarboxylic acid" and the possibly coincidentally used polybasic carboxylic acid are bonded to the epoxy resin or the polyhydroxyl compound by approximately one carboxylic group. The small percentage of non-reacted polybasic carboxylic acids possibly remaining in the reaction product is generally of no importance.

Esterification is facilitated by adding basic catalysts, such as anhydrous sodium carbonate, which accelerate the splitting up of the epoxide groups. In this way polymerization is slowed simultaneously, thus resulting in resins of a lower viscosity.

The considerable increase of viscosity when esterifying high molecular epoxy resins with "tricarboxylic acids" and/or anhydrides may possibly lead to difficulties of production. When using anhydrides of "tricarboxylic acids," it is possible to effect esterification in the presence of such solvents which do not participate in the esterifying reaction. Solvents, which are at least partially miscible with water are preferred, such as glycol or diglycol diether, esterified glycol monoethers, such as ethyl glycol acetate or even ketones, such as methyl isobutyl ketone. Such solvents usually do not need to be removed, as they do not impair the water-dilutability of the resin. When using solvents, not soluble in water, these will have to be removed before neutralization.

The quantitative proportion of compounds carrying epoxy groups or possibly hydroxyl groups, or such polyhydroxyl compounds as have been obtained by hydrolytic cleavage of compounds carrying epoxy groups and "tricarboxylic acids" or possibly coincidentally used polybasic carboxylic acids, possibly their anhydrides, may be varied within wide limits. It is, of course, dependent on the type and size of molecules of the polybasic carboxylic acids used and the compounds carrying epoxy groups, possibly hydroxyl groups. When producing water-dilutable coating compounds by partially esterifying epoxy resins based on bisphenol-A and epichlorohydrin with adducts of $\alpha,\beta$-unsaturated dicarboxylic acids with unsaturated fatty acids, very good resins are obtained when in the initial mixture the proportion of hydroxyl groups (one epoxy group is calculated as two hydroxyl groups, phenolic hydroxyl groups being disregarded) to carboxyl groups (one anhydride group is calculated as two carboxyl groups), falls within the range of 1:0.8 to 1:2. A proportion in the range of 1:1 to 1:1.4 is preferred.

When a very high carboxyl group excess is chosen, so that the epoxy resin is almost completely esterified, a subsequent esterification of the epoxy resin ester with mono and/or polyvalent alcohols is advantageous. As monovalent alcohols, methanol, ethanol, n-propanol, isopropanol, n-butanol, isobutanol, sec.-butanol, pentanol, hexanol, etc. are useful. As polyvalent alcohols, ethylene glycol, 1,2- and 1,3-propylene glycol, 1,2-, 1,3-, 2,3-, 1,4-butylene glycol, neopentyl glycol, glycerol, trimethylol propane, trimethylol ethane, pentaerythritol, etc. are useful.

By choosing the carboxylic acids in their proper quantitative proportions, it is possible to control the properties of the resin with respect to flexibility, hardness, corrosion protection, etc. of the lacquer films produced therefrom and also, e.g., the amount of deposition, when using the electrophoretic coating process.

The mixing proportion of the components brought to reaction, epoxy compound and carboxylic acid or their mixtures, respectively, and the degree of esterification between the epoxy compounds and the carboxylic acids or their anhydrides, however, must be chosen in any case, so that resins which are water-soluble or which can be dispersed in water are produced, after neutralization with aqueous ammonia solution or strong organic nitrogen bases. "Strong" organic nitrogen bases are defined by the fact that a 0.05 normal aqueous solution possesses a pH value greater than or equal to 10, determined at 25° C.

With low molecular epoxy resins, which contain a large number of epoxy groups, reaction can be led in such a way that the reaction products with "tricarboxylic acids" and possibly the coincidentally used polybasic carboxylic acids are indeed water-soluble after neutralization, but the aqueous solutions still gelatinize after some time. Generally, this property is not desired. In order to obtain sufficient storage life, the reaction should be continued until the number of remaining epoxy groups has become negligibly small.

For neutralization of the acid esters, aqueous ammonia solutions or strong organic nitrogen bases are suitable alone or in mixtures, such bases including triethylamine, diethylamine, trimethylamine, piperidine, morpholine, etc., especially suitable being alkylol amines, such as dimethyl ethanol amine, diethanol amine, triethanol amine, preferably di-iso-propanol amine, etc. The water-dilutable coating compounds, produced with di-isopropanol amine have better electrical film resistance consistency for the electrophoretic baths prepared therefrom. Polyamines, such as ethylene diamine, triethylene tetramine, diethylene triamine, are as a rule only used in a mixture with mono-amines. For neutralization it is not necessarily required to use the theoretically caculated quantity of neutralization agents. Frequently a smaller quantity gives adequate water-solubility. Tertiary, volatile, strong organic amine bases, like triethyl amine and dimethyl ethanol amine, are preferably used.

As being described before the epoxy resin partial ester to be produced must contain so many free carboxyl groups that the resin becomes water-dilutable after neutralization by aqueous ammonia or strong organic nitrogen bases.

In order to obtain a prescription for a new epoxy resin partial ester according to this invention on an industrial scale a model production on a laboratory scale is carried out. Of the artificial resin being obtained by the model production a test part of 8 g. is diluted using 2 g. of ethyl glycol, and by stirring a homogeneous solution is produced. Aqueous ammonia or a strong organic nitrogen base is added to this homogeneous solution until the pH value of 8 has been reached.

Then the solution is being diluted with water to a solids content of 10% by weight. This resin solution has to be water-dilutable and may not contain undissolved portions. This condition has already been fulfilled when the solution becomes milky. In this case the model production has to be repeated using a larger quantity of hydrolyzed adducts as polybasic carboxylic acid.

The thus obtained prescription for the production of water-dilutable epoxy resin partial ester can then be employed on a larger scale without having to repeat this procedure for the industrial production.

COMPARISON TESTS TO DEMONSTRATE THE ADVANCE OVER THE PRIOR ART

Test 1

In order to compare the present invention with Example 4 of the Tanner patent, a process was carried out wherein 500 g. "Epicote 1001" were reacted with 160 g. dehydrated castor oil fatty acid at 220° C. until the acid number was under 3. This epoxy resin fatty acid was then reacted with 150 g. of a maleic anhydride adduct.

The maleic anhydride adduct was prepared by reacting 675 parts dehydrated castor oil fatty acid and 450 parts tall oil fatty acid with 375 parts maleic anhydride under inert gas at 180 to 200° C. By adding 1.5 parts triphenyl phosphite, a considerable color improvement was obtained. After two hours the resin had reached an acid number of 42. The viscosity of the resin amounted to 700 cp. measured 50 percent in butyl glycol at 25° C. The resin was diluted with butyl glycol to a solids content of 70 percent and was neutralized with ammonia or amine.

The product is applied, which after the adduct formation of the maleic acid anhydride is not hydrolyzed with water. In this case the product gelled after one hour without having been able to reach the required acid number.

Test 2

In order to compare the present invention with the teachings of the Spalding patent, the same procedure was adopted as in Example 1, however, instead of the adduct used in this example a product was applied, which was obtained by reaction of 675 parts of dehydrated castor oil fatty acid and 455 parts tall oil fatty acid with 434 parts fumaric acid under inert gas at 180 to 200° C. The reaction was carried out long enough until no free fumaric acid could be traced. The reaction product gelled after one hour without the required acid number being reached.

It is concluded from the experiments that an adduct of fumaric acid to unsaturated fatty acid in the molar ratio 1:1 behaves in principle exactly the same as an unhydrolyzed adduct of maleic anhydride to unsaturated fatty acid in the same molar ratio. As ascertained from the experiments, the finished products are in principle identical, i.e. also on the addition of fumaric acid, first of all maleic acid is formed from fumaric acid during the reaction period, whereby this maleic acid then reforms as anhydride.

This reaction does not take place with the products described in the Spalding patent. It is actually in order to avoid the formation of anhydride groups that fumaric acid in applied (see column 4, lines 14 to 21). The reason for this lies in the fact that in all the examples of the Spalding patent nowhere is a molar ratio of fatty acid to fumaric acid of 1:1 used but always a considerable molecular excess of fatty acid resp. oil to fumaric acid. On account of these conditions, only a relatively short time is necessary for adduct formation of the fumaric acid (maximum 6 hours). When, however, a molar ratio of furmaric acid to fatty acid of approximately 1:1 used as in the case of the present invention, substantially longer reaction periods are required for a complete adduct formation of the fumaric acid and these periods range between 25 and 35 hours. It is assumed on the basis of the experiments that through this long reaction period the conversion of the fumaric acid to maleic acid and the formation of the anhydride is made possible.

The deciding advantage of the present invention compared with the prior art lies in the fact that the adducts are hydrolyzed before the reaction process. In this way a premature gellation of the resins is avoided. Even when the procedure as in the patent of Spalding is transferred to the present invention, i.e. the use of fumaric acid on adduct formation, this hydrolysis step is necessary. This fact is, however, not suggested by the prior art in any way.

In the case of the Tanner patent, the use of polycarboxylic acids as they are described for example in the patent is not very suitable for the working method of the present invention, as polycarboxylic acids of this kind yield highly viscous products after the hydrolysis, as is clearly explained in application Ser. No. 532,867. The highly viscous polycarboxylic acids of Tanner are little suited to the production of water-soluble coating compositions.

Test 3 (to demonstrate the advance over Belgian Pat. 662,518)

The coating composition acording to Example 2 of the present invention is being produced.

After the acid number of 130 had been reached the resin was diluted using ethyleneglycolmonoethylether to a solid content of 70% by weight. The resin was then mixed in a ball mill with a mixture of equal parts of titanium dioxide and aluminum silicate to produce a pigment/binding agent ratio of 0.3:1, and was diluted with deionized water until the solid content amounted to 13% by weight after being neutralized with dimethylethanolamine. Ungreased steel sheets were coated with a thickness of layer of 22 to 25μ using the above composition in an electrophoresis bath. The coated sheets were cleaned with deionized water and stoved at a temperature of 170° C. for 30 minutes.

Test 4

An epoxy resin partial ester was prepared according to Example 2 of the Belgian Pat. 662,518, wherein 130 grams of "Epicote 1001" (1 gram-equivalent) and 375 grams "Admerginate A" (3 gram-equivalents) are refluxed in 56 grams of xylene at 140° C. for a period of 3½ hours and this temperature is maintained for half an hour. After distilling off the xylene in vacuum the resin was diluted with ethyleneglycolmonoethylether to a solid content of 70% by weight (corresponding to Test 3). The resin was diluted and pigmented as disclosed in Test 3 and the composition was used in an electrophoresis bath. Ungreased steel sheets were coated in this electrophoresis bath only to a layer thickness of about 12 to 14μ because thicker films burst during the electrophoretic deposition. The epoxy resin employed "Epicote 1001" and the employed "Admerginate A" are used in the hydroxy group/carboxyl group ratio of 1:3.

Test 5

An epoxy resin partial ester was prepared according to Example 3 of the Belgian Pat. 662,518 wherein 130 grams of "Epicote 1001" (1 gram-equivalent) and 250 grams of "Admerginate A" (2 gram-equivalents) are refluxed in 42 grams of xylene at 145° C. for a period of 30 minutes. After distilling off the xylene in vacuum the epoxy resin partial ester was diluted with ethyleneglycolmonoethylether to a solid content of 70% by weight (corresponding to Test 4). The resin was diluted and pigmented as disclosed in Test 4 and the composition was used in an electrophoresis bath. Ungreased steel sheets were coated in this electrophoresis bath only to a layer thickness of about 12 to 14μ because thicker films burst during the electrophoretic deposition. The epoxy resin employed "Epicote 1001" and the employed "Admerginate A" are used in a hydroxyl group/carboxyl group ratio of 1:2.

Test 6

A resin was made in accordance with Example 2 of the present application, but instead of the "Primary Product 1" the same amount of "Admerginate A" was used. The resin gelatinized after 40 minutes.

Test 7

An epoxy resin partial ester was prepared according to Test 5 but the 375 grams of "Admerginate A" were hydrolyzed prior to the reaction with "Epicote 1001" by treating the "Admerginate A" with 20 grams of water of 100° C. during 2 hours. The epoxy resin partial ester was diluted and pigmented as disclosed in Test 4 and the composition was used in an electrophoresis bath. Ungreased steel plates were coated in an electrophoresis bath to a layer thickness of about 12 to 14μ because thicker films burst during the electrophoretic deposition.

Test 8

An epoxy resin partial ester was made in accordance with Example 2 of the present application but instead of the "Primary Product 1" the same amount of unhydrolyzed "Primary Product 1" was used. The unhydrolyzed "Primary Product 1" was prepared by reacting 45 parts dehydrated castor oil fatty acid, 30 parts tall oil fatty acid, and 25 parts maleic anhydride in a flask with an agitator and cooler in an inert gas atmosphere at 180° C. to 220° C. until no more than 3% by weight of the maleic anhydride starting material was present. The resin gelatinized after 30 minutes.

Test 9

An epoxy resin partial ester was produced according to Example 3 of the Belgian Pat. 662,518, whereby 130 grams of "Epicote 1001" and 250 grams of "Primary Product 1" of this invention in 42 grams of xylene were refluxed 80 minutes at 145° C. and were kept at this temperature for another 30 minutes.

After distilling off the xylene the resin was diluted with ethyleneglycolmonoethylether to a solid content of 70% by weight. The resin was then diluted and pigmented as disclosed in Test 3 and the composition was used as electrophoresis bath. Ungreased steel sheets were coated in this electrophoresis bath, whereby a layer thickness of 25 micron was reached without difficulties.

A short summary of Tests 3 to 9 is presented in Table 1:

TABLE 1

| According to— | There are brought to reaction— | OH/COOH ratio | Using hydrolyzed adduct | Used fatty acid for adduct formation |
|---|---|---|---|---|
| Test Number: | | | | |
| 3 | Invention Example 2 | 400 g. epoxy resin on the basis of bisphenol A and 740 g. primary product 1. | 1:1.14 | Yes | Tall oil fatty acid/ricinene fatty acid. |
| 4 | Example 2 Belgian Patent 662,518 | 130 g. "Epicote 1001," 375 g. "Admerginate A." | 1:3 | No | Isomerized fatty acid. |
| 5 | Example 3 Belgian Patent 662,518 | 130 g. "Epicote 1001," 250 g. "Admerginate A." | 1:2 | No | Do. |
| 6 | Comparison test epoxy resin according to invention but instead "primary product 1" same amount "Admerginate A." | 400 g. epoxy resin on the basis bisphenol A and 740 g. "Admerginate A." | 1:1.14 | No | Do. |
| 7 | Comparison test according Example 2 of Belgian Patent 662,518 but hydrolyzed "Admerginate A." | 130 g. "Epicote 1001," 375 g. hydrolyzed "Admerginate A." | 1:3 | Yes | Do. |
| 8 | Comparison test according Example of present invention but not hydrolyzed primary product 1. | 2400 g. epoxy resin on the basis of bisphenol A and 740 g. primary product 1 not hydrolyzed. | 1:1.14 | No | Tall oil fatty acid/ricinene fatty acid. |
| 9 | Comparison test according Exmple 3 Belgian Patent 662,518 and primary product 1 of present invention. | 130 g. "Epicote 1001," 250 g. primary product 1 of the present invention. | 1:2 | Yes | Do. |

The steel plates coated in acordance with Tests 3, 4, 5, 7 and 9 were then subjected to the salt-spray-test (ASTM B-117-61) and evaluated after 100 hours. The results are shown in Table 2.

TABLE 2

| Resin of test: | Swell width (mm.) | Surface, 1=best value | Edge, 5=worst value |
|---|---|---|---|
| 3 | 4 | 1 | 2 |
| 4 | 12 | 5 | 5 |
| 5 | 10 | 3 | 5 |
| 6 | Gelled | | |
| 7 | 12 | 5 | 5 |
| 8 | Gelled | | |
| 9 | 5 | 2 | 2 |

From these tests the following observations can be made:

(a) According to Tests 6 and 8 using unhydrolyzed adducts as polycarboxylic acid anhydrides no epoxy resins partial esters can be produced which have a ratio of OH-equivalents/COOH-equivalents of nearly 1:1. (Under Tests 3 and 6 the ratio of OH/COOH is 1:1.14.)

(b) According to Tests 4 and 5 resins made in accordance with Examples 2 and 3 of the Belgian Pat. 662,518 (by using "Epicote 1001" as epoxy resin and "Admerginate A" as adduct made of *isomerized* and unsaturated fatty acids and maleic *anhydride*) show only insufficient thickness of layer after the electrophoretic deposition because of their high acid number and the high electrical resistance of the film. The corrosion resistance of the coatings is not satisfactory.

(c) According to Tests 3, 7, 8 and 9 in order to obtain useful epoxy resin partial esters having an OH-equivalent/COOH-equivalent ratio of about 1:1 only hydrolyzed adducts consisting of maleic acid or maleic anhydride with unsaturated fatty acids having 10 to 24 carbon atoms, wherein said unsaturated fatty acids are selected from the group consisting of natural fatty acids, dehydrated castor oil fatty acids, tall oil fatty acids and mixtures thereof, can be used.

(d) According to Test 9 by using adducts made of maleic anhydride and unsaturated fatty acids selected from the group consisting of natural fatty acids, dehydrated castor oil fatty acids, tall oil fatty acids and mixtures thereof you obtain epoxy resins which show a lower electrical resistance of the coatings during electrophoretic deposition and can therefore be deposited in adequately thick layers.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Throughout the examples the term parts refers to parts by weight.

EXAMPLE 1

Production of the primary product 1

45 parts dehydrated castor oil fatty acids, 30 parts tall oil fatty acids and 25 parts maleic acid anhydride are reacted in a flask with agitator and cooler under an inert gas atmosphere at 180 to 220° C., until no more than 3% by weight of the maleic acid anhydride starting material is free. Afterwards, the reaction product is hydrolyzed by adding 5 parts water and by maintaining the mix for 2 hours at 100° C.

Production of the epoxy resin ester 300 parts of an epoxy resin obtained by reacting bisphenol-A with epichlorohydrin in the presence of alkali and having a melting point of 20 to 28° C., an epoxy equivalent weight of 225 to 290 and a molecular weight of approximately 470 are brought to reaction with 600 parts primary product 1 under an inert gas atmosphere and the temperature is held at 120 to 100° C. until the acid number of the mixture has fallen by about one-third. The resin is neutralized after adding 20% by weight glycol monoethylether with aqueous ammonia solution until a 20% strength by weight aqueous solution shows a pH value of 7.8 to 9 and a viscosity of 100 sec. (German Industrial Standard 53,211).

EXAMPLE 2

600 parts of an epoxy resin are obtained by reacting bisphenol-A with epichlorohydrin in the presence of alkali, the resulting resin having a melting point of 64 to 76° C., an epoxy equivalent of 450 to 525 and a molecular weight of approximately 900. The resin is reacted in a suitable reaction container, equipped with agitator, cooler and thermometer, with 740 parts primary product 1. The acid number of the mixture is then determined and the mixture is maintained at about 120° C. until the acid number has fallen by about a third. As soon as the acid number has been reached, 140 parts diethylene glycol diethylether and 150 parts ethyl glycol are added. After the addition of 150 parts water, the mix is neutralized with triethylamine, until the pH value of a 20% strength by weight aqueous solution amounts to approximately 8 to 9 and a viscosity of 115 sec. (German Industrial Standard 53,211).

EXAMPLE 3

Preparation of a bath solution suitable for electrophoretic coating 10 kg. of a 40% strength by weight solution of the resin according to Example 1 or 2 are ground with 2 kg. iron oxide in a ball mill and diluted with deionized water to a solid content of approximately 10 to 15% by weight. For the electrophoretic coating process the metallic body is dipped into the bath as anode. When using a D.C. voltage of approximately 100 to 120 volts, the body is uniformly coated with the coating compound produced according to the invention. By adding limited quantities of suitable organic solvents, miscible at least to a large extent with water, e.g. ethyl glycol, n-butyl glycol, the thickness of the layer deposited is increased. By stoving at 170 to 190° C. for 30 to 20 minutes, a highly corrosion-resistant coating is obtained having a viscosity of 110 sec.

EXAMPLE 4

Production of the primary product 2

280 parts soya oil fatty acid and 100 parts maleic anhydride are mixed and heated to 180–220° C. in an inert gas atmosphere until no more than 3% by weight of free maleic anhydride are present. Then the reaction product is hydrolyzed by adding 20 g. deionized water and keeping the mix at 100° C. for 2 hours.

Production of the epoxy resin ester 500 parts of an epoxy resin being obtained by reaction of bisphenol-A and epichlorohydrin in the presence of alkali and which has a melting point of 64 to 76° C., an epoxy equivalent weight of 450–525 and a molecular weight of about 900 is mixed with 500 parts primary product 2 in a suitable reaction vessel. This mixture is heated to 120° C. and is kept at this temperature until an acid number of about 140 is reached; then the resin is diluted to a solid content of 70% by weight using ethyleneglycol monoisopropylether. After neutralization using triethylamine a resin of unlimited water-solubility is obtained having a viscosity of 120 sec. (German Industrial Standard 53,211).

EXAMPLE 5

Production of the primary product 3

Same as primary product 2 but instead of soya oil fatty acid 280 parts of tall oil fatty acid is employed.

Production of the epoxy resin ester

The instructions of Example 4 are followed except that the same amount of primary product 3 is being used.

The accordingly obtained resin can be diluted with water and shows a viscosity of 100 sec. (German Industrial Standard 53,211). The coating compositions obtained according to the foregoing examples can be deposited electrophoretically in thin layers because of their low viscosities. These coating compositions are excellently suitable for the production of metal primers which can be deposited electrophoretically. After stoving at 170° C. for 30 minutes coatings are obtained of excellent corrosion resistivity, especially on zinc phosphated iron sheets.

EXAMPLE 6

The instructions of Example 1 are to be followed but instead of the epoxy resin being there described now 330 parts of a reaction product of the epoxy resin and ethanol are employed.

This reaction product has been obtained as follows:

300 parts of epoxy resin having an epoxy equivalent weight of 225 to 290 are dissolved in 1000 parts of a mixture of equal parts of xylene and ethyleneglycol. A mixture of 20 g. methanol and 1 g. of a 40% strength by weight ether solution of boron trifluoride was added. Then this solution was refluxed for one hour and the excess ethanol and xylene were removed by distilling in vacuum.

The obtained epoxy resin is suitable excellently for the electrophoretic application and gives coatings of high corrosion resistance after stoving at 170° C. for 30 minutes.

For electrophoretic deposition epoxy resin esters are preferably used, the viscosity of which is in the range of 30–120 sec. (German Industrial Standard 53,211) in an non-neutralized, anhydrous 50% by weight n-butyl glycol solution.

As has been shown by the above examples such partial esters made up of dehydrated castor oil, tall oil and maleic anhydride are the most preferred because of the accordingly obtained lower viscosity of the resulting epoxy resins.

The compositions of the present invention are suitable applied to the following materials: iron or steel, non-ferrous metals without preliminary treatment or with previous treatment as passivation, phosphatizing, zincing, timming and other metal coatings. The pre-coat on the base material is such that it permits baking at higher temperatures of at least 150° C.

The preceding examples can be repeated with similar success by substituting the generally and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adopt it to various usages and conditions. Consequently, such changes and modifications are properly, equitably, and intended to be, within the full range of equivalence of the following claims.

I claim:

1. A method of producing water-dilutable coating compositions by partial esterification of epoxy resins selected from the group consisting of glycidylether compounds which are condensation products of 2,2-bis-(4-hydroxyphenyl)-propane with a compound selected from the group consisting of epichlorohydrin, dichlorohydrin and mixtures thereof produced in the presence of an alkali by heating such compounds with tribasic carboxylic acids to reduce the number of epoxy groups contained therein, and neutralizing the partial esters with a basic compound selected from the group consisting of ammonia, organic nitrogen bases and mixtures thereof, the improvement comprising preparing said tribasic carboxylic acids by (a) heating to form an adduct of a member selected from the group consisting of maleic acid or maleic anhydride with unsaturated fatty acids having 10–24 carbon atoms, wherein the molar proportion of said unsaturated fatty acid to said maleic acid or maleic anhydride is 0.9:1 to 1.1:1 and wherein said unsaturated fatty acids are mixtures of dehydrated castor oil fatty acids and tall oil fatty acids;

(b) hydrolyzing said adduct to form said tribasic acids having no anhydride groups, and then esterifying said hydrolyzed adduct by partial esterification of said epoxy resins, wherein the proportion of hydroxyl groups to carboxyl groups falls within the range of 1:1:1.4, said epoxy groups calculated as 2 hydroxyl groups producing such epoxy resin partial esters preferably for electrophoretic deposition which have the viscosity in the range of 30–120 sec. in a non-neutralized, anhydrous 50 percent by weight n-butyl glycol solution according to German Industrial Standard 53,211.

2. The method of claim 1, wherein said adduct of step (a) is heated until no more than 3 percent by weight of free maleic acid anhydride is present.

3. The method of claim 1, wherein said condensation products have molecular weights of about 380 to 3500.

4. The method of claim 1, wherein said unsaturated fatty acids are in the form of esters of unsaturated fatty acids with saturated, straight chain, aliphatic monoalcohols having 1 to 20 carbon atoms.

5. The method of claim 1, wherein said unsaturated fatty acids are in the form of partial esters of unsaturated fatty acids with saturated, straight chain, aliphatic monoalcohols having 1 to 20 carbon atoms.

6. The method of claim 1, wherein said basic compound is di-iso-propanolamine.

7. The product obtained by the method of claim 1.

8. The product obtained by the method of claim 2.

References Cited

UNITED STATES PATENTS

| | | | |
|---|---|---|---|
| 3,397,159 | 8/1968 | Slater | 260—18 EP |
| 3,355,401 | 11/1967 | Tanner | 260—18 EP |
| 3,308,077 | 3/1967 | Pattison | 260—23 |
| 3,305,501 | 2/1967 | Spalding | 260—29.2 EP |
| 3,300,424 | 1/1967 | Hoenel | 260—18 CL |
| 2,941,968 | 6/1960 | McKenna | 260—23 |
| 3,293,201 | 12/1966 | Shahade | 260—29.2 EP |
| 3,658,738 | 4/1972 | Van Westrenen | 260—29.2 EP |
| 3,650,996 | 3/1972 | Guldenpfennig | 260—18 EP |
| 3,627,720 | 12/1971 | Hinton | 204—181 |
| 3,624,013 | 11/1971 | Sekmakas | 260—18 EP |
| 3,598,775 | 8/1971 | Huggard | 260—18 EP |
| 3,563,929 | 2/1971 | Guldenpfennig | 260—29.2 EP |
| 3,563,926 | 2/1971 | Lackner | 260—18 EP |
| 3,518,212 | 6/1970 | Ruecke | 260—18 EP |
| 3,479,306 | 11/1969 | Safranski | 260—29.2 EP |
| 3,464,939 | 9/1969 | Van Westrenen | 260— 29.2 EP |
| 3,427,266 | 2/1969 | Phillips | 260—29.2 EP |

FOREIGN PATENTS

| | | | |
|---|---|---|---|
| 662,518 | 8/1965 | Belgium | 260—18 CL |

DONALD E. CZAJA, Primary Examiner

C. W. IVY, Assistant Examiner

U.S. Cl. X.R.

204—181; 260—22 EP, 29.2 EP